United States Patent
Dang et al.

(10) Patent No.: US 12,401,624 B2
(45) Date of Patent: *Aug. 26, 2025

(54) SECURITY SYSTEM AND METHOD FOR PRESSURE CONTROL EQUIPMENT

(71) Applicant: Schlumberger Technology Corporation, Sugar Land, TX (US)

(72) Inventors: Anh Dang, Sugar Land, TX (US); Matthew Olson, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,735

(22) Filed: Aug. 16, 2023

(65) Prior Publication Data
US 2023/0396589 A1 Dec. 7, 2023

Related U.S. Application Data

(63) Continuation of application No. 17/065,315, filed on Oct. 7, 2020, now Pat. No. 11,765,131.
(Continued)

(51) Int. Cl.
*H04L 9/40* (2022.01)
*E21B 33/064* (2006.01)
*E21B 44/06* (2006.01)

(52) U.S. Cl.
CPC ........ *H04L 63/0263* (2013.01); *E21B 33/064* (2013.01); *E21B 44/06* (2013.01); *H04L 63/0435* (2013.01); *H04L 63/1416* (2013.01); *H04L 63/1425* (2013.01); *H04L 63/1433* (2013.01)

(58) Field of Classification Search
CPC ............. H04L 63/0263; H04L 63/0435; H04L 63/1416; H04L 63/1425; H04L 63/1433; H04L 63/0428; H04L 63/101; E21B 33/064; E21B 44/06; E21B 33/0355; E21B 47/138
See application file for complete search history.

(56) References Cited

U.S. PATENT DOCUMENTS 3,252,528 A 5/1966 Nicolson
4,053,023 A 10/1977 Herd
(Continued)

FOREIGN PATENT DOCUMENTS

BR 102012009708 A2 * 5/2014 ............. E21B 21/08
CN 1954309 A 4/2007
(Continued)

OTHER PUBLICATIONS

Olson, M. et al., "Cybersecurity Solutions for Offshore BOP Controls", presented at the IADC Cybersecurity for Drilling Assets Conference, Oct. 8, 2019, 9 pages.
(Continued)

*Primary Examiner* — Shahriar Zarrineh
(74) *Attorney, Agent, or Firm* — Jeffrey D. Frantz

(57) ABSTRACT

A drilling system includes a surface system comprising a control panel. The drilling system further includes a pressure control equipment configured to be operatively coupled to the control panel, wherein the control panel comprises at least one intrusion prevention system (IPS) enabled device configured to provide for one or more IPS functions.

6 Claims, 9 Drawing Sheets

Related U.S. Application Data

(60) Provisional application No. 62/911,752, filed on Oct. 7, 2019.

(56) References Cited

U.S. PATENT DOCUMENTS

| | | | |
|---|---|---|---|
| 5,627,567 A | 5/1997 | Davidson | |
| 6,484,806 B2 | 11/2002 | Childers | |
| 7,261,162 B2 | 8/2007 | Deans | |
| 7,576,447 B2 | 8/2009 | Biester | |
| 7,954,161 B1 | 5/2011 | Guruswamy | |
| 8,121,971 B2 * | 2/2012 | Edwards | E21B 44/00 706/50 |
| 8,212,378 B2 | 7/2012 | Biester | |
| 9,322,247 B2 * | 4/2016 | Rojas | E21B 44/00 |
| 9,322,264 B2 | 4/2016 | Gutierrez | |
| 9,658,130 B2 | 5/2017 | Veeningen | |
| 9,760,464 B1 | 9/2017 | Helliwell | |
| 9,772,608 B2 | 9/2017 | Spacek | |
| 9,934,338 B2 * | 4/2018 | Germain | E21B 7/00 |
| 9,970,287 B2 | 5/2018 | Jaffrey | |
| 10,000,987 B2 | 6/2018 | Springett | |
| 10,196,871 B2 | 2/2019 | Holmes | |
| 10,202,839 B2 | 2/2019 | Scott | |
| 10,260,332 B2 * | 4/2019 | Israel | E21B 45/00 |
| 10,273,752 B2 * | 4/2019 | Mebane, III | E21B 43/003 |
| 10,294,770 B2 * | 5/2019 | Anghelescu | E21B 44/00 |
| 10,301,923 B2 * | 5/2019 | Andresen | E21B 44/00 |
| 10,539,001 B2 * | 1/2020 | Kpetehoto | E21B 44/02 |
| 10,539,010 B2 | 1/2020 | Gutierrez | |
| 10,579,231 B1 * | 3/2020 | Valleru | G06F 3/0482 |
| 10,705,499 B2 * | 7/2020 | Rojas | G06F 9/45558 |
| 10,788,543 B2 | 9/2020 | Emerich | |
| 2007/0163782 A1 | 7/2007 | Keener | |
| 2008/0185152 A1 | 8/2008 | Sbordone | |
| 2008/0208475 A1 | 8/2008 | Karr | |
| 2009/0099885 A1 | 4/2009 | Sung | |
| 2009/0225630 A1 * | 9/2009 | Zheng | E21B 47/00 367/81 |
| 2009/0328216 A1 | 12/2009 | Rafalovich | |
| 2011/0198092 A1 | 8/2011 | Machin | |
| 2011/0246783 A1 | 10/2011 | Unagami | |
| 2012/0067590 A1 | 3/2012 | Fossli | |
| 2012/0173218 A1 * | 7/2012 | Shafer | E21B 41/00 703/7 |
| 2012/0176251 A1 | 7/2012 | Klass | |
| 2013/0076525 A1 * | 3/2013 | Vu | E21B 47/00 340/853.1 |
| 2014/0137257 A1 | 5/2014 | Martinez | |
| 2015/0034327 A1 | 2/2015 | Ahn | |
| 2015/0163088 A1 | 6/2015 | Anschutz | |
| 2015/0242633 A1 | 8/2015 | Galil | |
| 2016/0290119 A1 | 10/2016 | Tunc | |
| 2016/0290120 A1 * | 10/2016 | Zheng | G05B 15/02 |
| 2016/0349357 A1 | 12/2016 | Spacek | |
| 2017/0114618 A1 * | 4/2017 | Fladmark | G06F 11/2007 |
| 2017/0142138 A1 | 5/2017 | Williams | |
| 2017/0295188 A1 | 10/2017 | David | |
| 2017/0356259 A1 * | 12/2017 | Culen | E21B 47/047 |
| 2018/0038187 A1 | 2/2018 | Bieneman | |
| 2018/0068114 A1 | 3/2018 | Matsuura | |
| 2018/0156005 A1 | 6/2018 | Carlsen | |
| 2018/0173182 A1 | 6/2018 | Miller | |
| 2018/0328159 A1 * | 11/2018 | Mandava | E21B 47/10 |
| 2018/0351952 A1 * | 12/2018 | Rojas | H04L 63/083 |
| 2019/0129822 A1 | 5/2019 | Alam | |
| 2019/0230120 A1 | 7/2019 | Chen | |
| 2019/0302723 A1 * | 10/2019 | Rojas | G06F 9/45558 |
| 2019/0356696 A1 * | 11/2019 | Rojas | H04L 41/0895 |
| 2019/0379683 A1 | 12/2019 | Overby | |
| 2020/0165914 A1 | 5/2020 | Allara | |
| 2020/0277847 A1 * | 9/2020 | Rojas | G06Q 10/20 |
| 2021/0105253 A1 | 4/2021 | Dang | |
| 2021/0119993 A1 | 4/2021 | Natal | |
| 2022/0215140 A1 | 7/2022 | Davis | |

FOREIGN PATENT DOCUMENTS

| | | | |
|---|---|---|---|
| CN | 104571090 A | 4/2015 | |
| CN | 104851352 A | 8/2015 | |
| CN | 104966454 A | 10/2015 | |
| CN | 105026679 A * | 11/2015 | E21B 17/01 |
| CN | 105364110 A | 3/2016 | |
| CN | 205632978 U | 10/2016 | |
| CN | 106130719 A | 11/2016 | |
| CN | 107046476 A | 8/2017 | |
| CN | 107209839 A | 9/2017 | |
| CN | 108603401 A * | 9/2018 | E21B 33/035 |
| CN | 108956118 A | 12/2018 | |
| CN | 109040039 A | 12/2018 | |
| CN | 109218336 A | 1/2019 | |
| CN | 109882151 A * | 6/2019 | |
| CN | 109960937 A * | 7/2019 | G06F 21/577 |
| CN | 112483074 A * | 3/2021 | |
| CN | 113011886 A | 6/2021 | |
| DE | 3812263 A1 | 11/1988 | |
| EP | 2917460 A1 | 9/2015 | |
| JP | 2002057712 A | 2/2002 | |
| KR | 20090090641 A | 8/2009 | |
| KR | 20150041872 A | 4/2015 | |
| KR | 20170079880 A | 7/2017 | |
| KR | 101911429 B1 | 10/2018 | |
| WO | 2016100663 A1 | 6/2016 | |
| WO | 2017018377 A1 | 12/2017 | |

OTHER PUBLICATIONS

"Cybersecurity Solutions—For offshore topside Cameron BOP control systems", Brochure No. 19-DRL-615790, 2019, 1 page.

* cited by examiner

SECURITY SYSTEM AND METHOD FOR PRESSURE CONTROL EQUIPMENT

This application is a continuation of U.S. patent application Ser. No. 17/065,315, filed Oct. 7, 2020 with the same title, which claims priority to and benefit of U.S. Patent Application Ser. No. 62/911,752, filed Oct. 7, 2019 with the same title. The applications in their entirety are incorporated by reference herein.

BACKGROUND

The present disclosure relates generally to techniques for securing communications and data within pressure control equipment control systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain industrial operations, such as oil and gas operations, control systems, such as supervisory control and data acquisition (SCADA) systems, industrial control systems, drilling control systems, and the like, may be used to provide for user interfaces, communications networks, sensors, and/or computing devices used to operate a variety of equipment. For example, in oil and gas operations, drilling and well as extraction systems may benefit from computing environments used to monitor and control the drilling and/or extraction of hydrocarbon-based resources. It may be useful to improve security of these monitoring and control systems.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
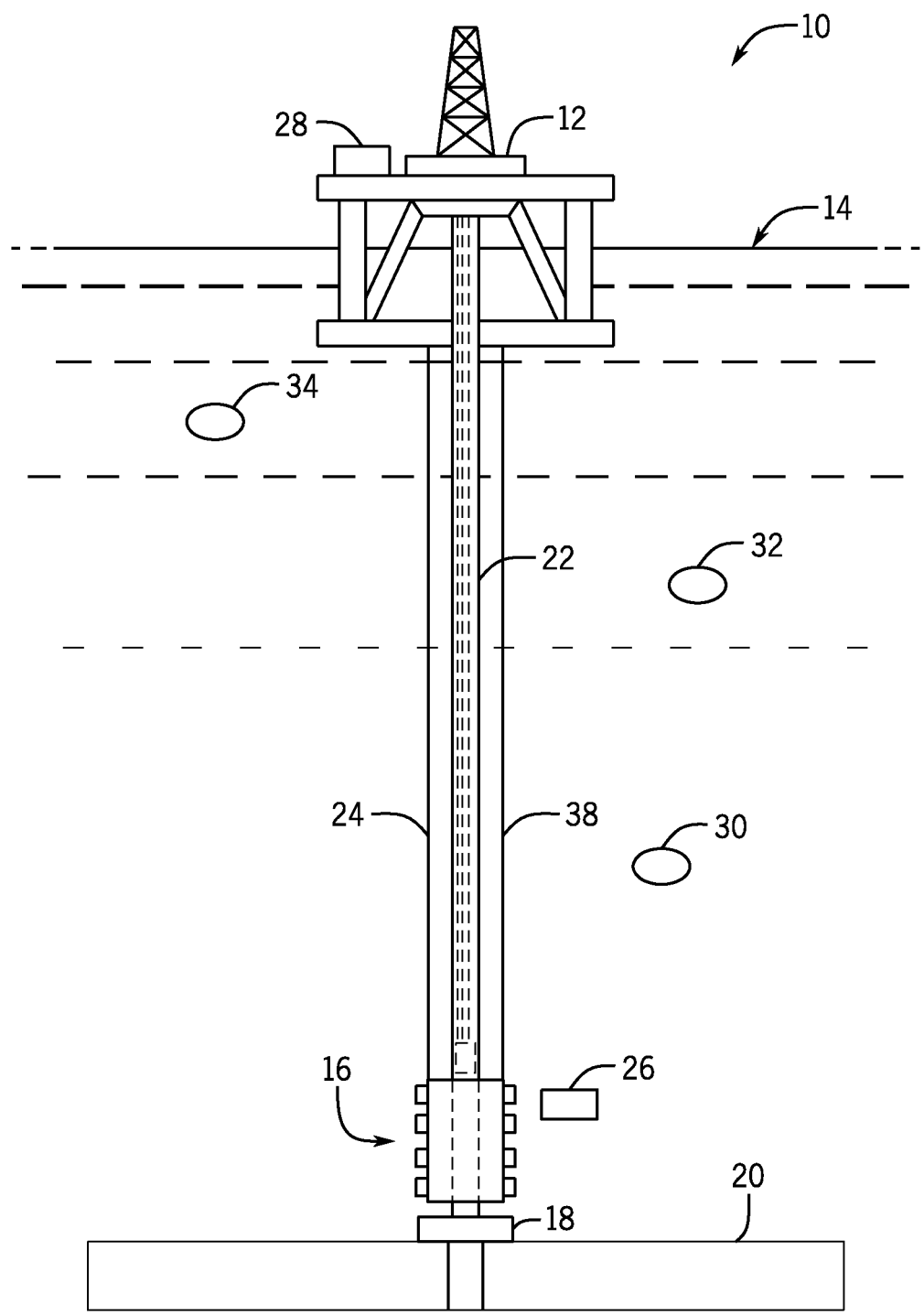
FIG. 1 is a schematic diagram of a drilling system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof. Numerical terms, such as "first," "second," and "third" may be used to distinguish components to facilitate discussion, and it should be noted that the numerical terms may be used differently or assigned to different elements in the claims. The drawing figures are not necessarily to scale. Certain features and components herein may be shown exaggerated in scale and/or in somewhat schematic form. Some details may not be shown in the interest of clarity and conciseness.

In industrial operations, such as oil and gas operations, control systems, such as supervisory control and data acquisition (SCADA) systems, industrial control systems, drilling control systems, and the like, may be used to provide for user interfaces, communications networks, sensors, and/or computing devices used to operate a variety of equipment. In well drilling operations such as in the oil and gas industry, blowout preventers (BOPs) may be used as a "valve" for well pressure control. A BOP stack may be installed on a wellhead to seal and control an oil and gas well during drilling operations. A drill string may be suspended inside a drilling riser from a rig through the BOP stack into the well bore. During drilling operations, a drilling fluid may be delivered through the drill string and returned up through an annulus between the drill string and a casing that lines the well bore. In the event of a rapid invasion of formation fluid in the annulus, commonly known as a "kick," the BOP stack may be actuated to seal the annulus and to control fluid pressure in the wellbore, thereby protecting well equipment disposed above the BOP stack.

BOP functions are managed via a BOP control system, for example, with a primary module that is located at the surface and that may comprise various electronics such as for example, a processor, a memory component and sensors. The processor may receive data from the sensors distributed throughout the module, or access data stored on the memory component, run programs stored on the memory component, and then control the operation of the module by generating control signals.

For the processor and the BOP control system in general, consistency and reliability during operations is desired. System architects try, through their computer architecture designs, to provide a secure environment for transfer of data and secure operations. However, threat agents, intended or unintended may attempt to use malicious means to gain access to the control system network and the data being transferred. In some instances, computer networks may incorporate thousands of components and parts and the vulnerability of just one part of the network may allow the threat agent to have unauthorized access to other sections of the network. In controlling the BOP operations and status, for example, networks may be used to transfer real time data of field operations to a client or control center. The techniques described herein provide for a more secure SCADA, industrial control systems, drilling control systems by applying certain security systems and methods. Threat agents are also present at the operating technology or at the panel, securing the intrusion points on equipment is another layer of protection. For example USB drive access.

In some embodiments, a role-based model may be used to secure actions performed at an edge of one or more networks. Authenticating operational actions, such as valve actuation and data read using permissions inherited from information technology (IT) systems, may add a fine-grained layer of security deep into edge-of-network(s) data management and may lead to clear security-based differentiation compared to other systems (e.g., unsecured systems).

To improve cyber security for pressure control systems, the techniques described herein may combine a communication system, an operating system and a firewall-protected network. The communication system may comprise data historian systems to collect, aggregate, compress, transmit, and visualize BOP control system data, a user interface that analyzes and visualizes the information captured by the data historian, providing a user with alerts, life remaining, and recommended actions. In embodiments, and the communication system may provide real time monitoring data, prognostics and health management (PHM) data, and condition based maintenance (CBM) data. Intrusion prevention system (IPS) enabled devices may be provided, such as computing devices (e.g., computers, workstations, industrial computers), programmable logic controllers (PLCs) or other industrial controllers, networking devices (e.g., network switches), firewalls, input/output (I/O) systems, or any device or subsystem of the panels (e.g., control panels) described herein.

In certain embodiments of the present disclosure, the safety systems further include an operating system such as Windows 10™ available from Microsoft® corporation of Redmond, Washington, U.S.A., that can be either first installed or later retrofitted to, for example, BOP control systems. The operating system may then be hardened with security configurations and an application whitelisting solution (such as Microsoft® Applocker®) and connected to a firewall-protected network. In certain embodiments, the operating system may be accessed to detect malicious activity. In embodiments, the safety systems described herein may include Human Machine Interface (HMI) to log security events as part of a driller control panel, a tool pusher control panel, a supervisor control panel, and the like. As such, the safety system may enable the BOP control system to detect malicious activities. Security logs from HMI endpoints may be sent to a central security monitoring platform for data analytic and orchestration or integrated into a user's existing cybersecurity infrastructure for security monitoring.

In certain embodiments, the operating system may be configured to enforce least privilege policy on both application and user access level to reduce the system attack surface and minimize potential damage in case a cybersecurity attack happens. Further, the security systems described herein may be integrated with an enterprise security platform for supervision and management. The security system may then introduce security controls in a manner which does not affect field operation or which only minimally affects field operations. Further, methods described herein include performing a security audit, addressing certain security issues found, updating systems for enhanced security, testing and/or quality assurance of the enhanced system, and applying system updates on an ongoing basis to result in a more secure and robust system.

Turning now to FIG. 1, the figure is an embodiment of a subsea system 10. As shown, the subsea system 10 includes an offshore vessel or platform 12 at a sea surface 14. A stack assembly 16 (e.g., a blowout preventer (BOP) stack and/or a lower marine riser package (LMRP)) is mounted to a subsea production tree 18 at a sea floor 20. A riser 22 (e.g., marine drilling riser) extends from the platform 12 to the stack assembly 16. An underwater networking or communications system is 24 is also shown, which may be used to communicatively and/or operatively couple subsurface systems 26 to surface systems 28. The underwater networking system 24 may also be used to communicatively couple other oil and gas equipment, such as equipment 16, 18, sensing equipment (e.g., sensors, logging while drilling (LWD) equipment, measurement while drilling (MWD) equipment, and the like), to provide data to the surface 14.

Also shown are communication nodes 30, 32, 34 for use in and untethered underwater communications 36. In certain embodiments, the nodes 30, 32, 34 may provide for retransmission of data (e.g., data "hopping"), thus enabling for longer transmission distances and improved transmission energy. The communication nodes 30, 32, and/or 34 may be included, for example, in untethered remote underwater vehicles. However, it is to be understood that the communication nodes 30, 32, and/or 34 may be additionally or alternatively included in other electronics not part of a remote underwater vehicle. By providing for communicative systems 24, 30, 32, 34, 36, networks (including mesh networks) may be created, suitable for communications (e.g., one-way communication, two-way communication) between members of the networks and the surface 14.

Also shown is a hydraulic system 38. The hydraulic system 38 may provide for hydraulic power and actuation of one or more of the underwater systems 26, for example, by using fluid conduits. By using the techniques described herein such as operating system techniques, firewall techniques, and/or networking security techniques, systems included in the networks systems 24, 36, underwater systems 26, surface systems 28, and/or the hydraulic system 38, may be security enhanced and tested to provide for more reliable and protected operations as further described below.

Figure 2:
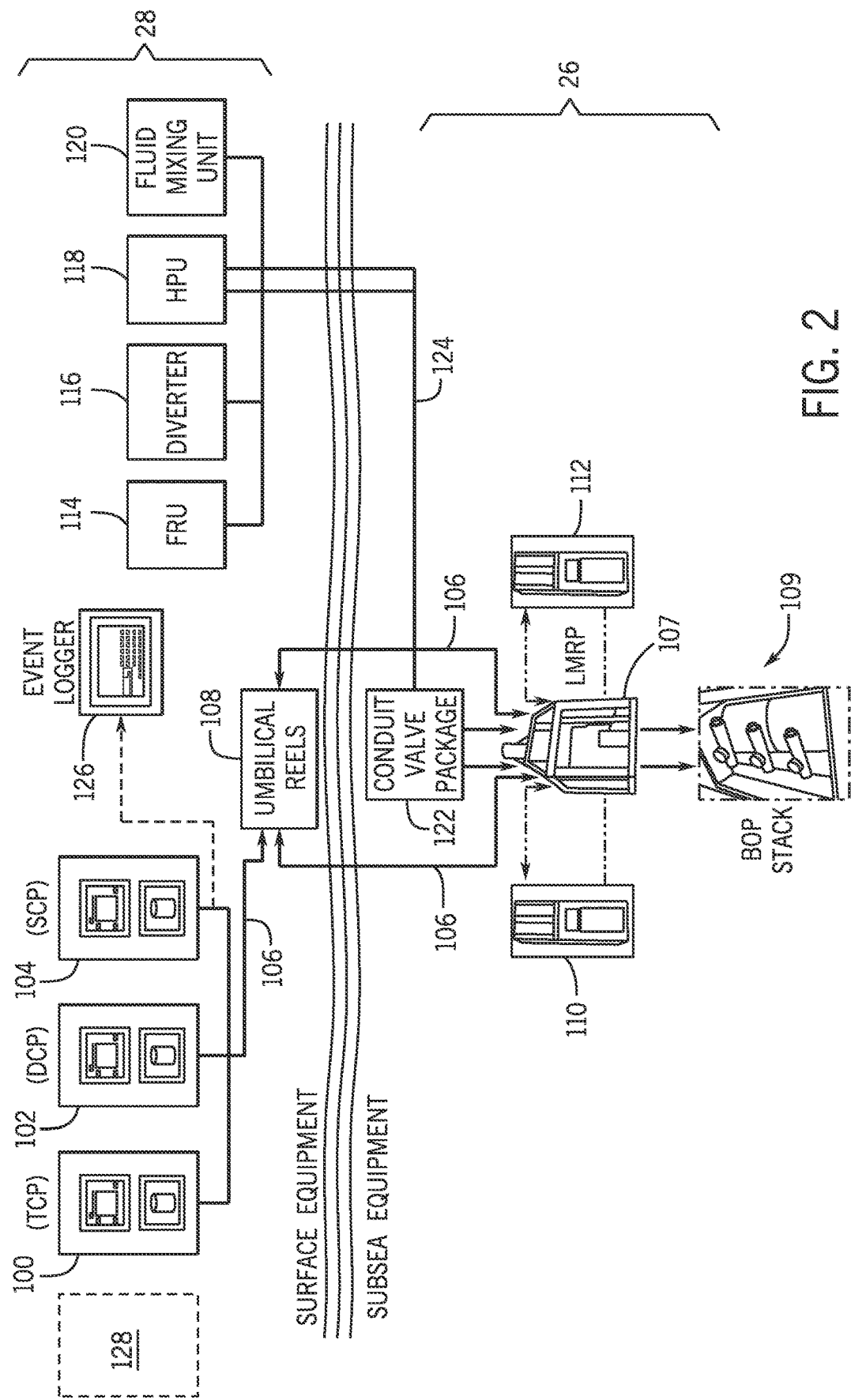
FIG. 2 is a block diagram of network systems, underwater systems, and surface systems used in the drilling system of FIG. 1, in accordance with an embodiment of the present disclosure.

It may be beneficial to describe certain surface and underwater systems that may benefit from the techniques described herein, as illustrated in FIG. 2. More specifically, FIG. 2 is a block diagram illustrating further details of the network system 24, the underwater systems 26, and the surface systems 28. In the depicted embodiment, the surface systems 28 include a tool pusher control panel (TCP) 100, a driller control panel (DCP) 102, and a supervisor control panel (SCP) 104. The driller control panel 102 may be located at a driller station and used to operate, for example, the stack assembly 16 (e.g., including the BOP) via the networking system 24. For example, the DCP 102 panel may include gauges or meters for remote indication of various operating pressures and open-close status of control valves positions.

The TCP 100 may be a redundant control panel to the DCP 100. That is, the TCP 100 may provide all or substantially all of the functionality and outputs provided by the DCP 102. The SCP 104 may also include gauges or meters for remote indication of various operating pressures and open-close status of control devices and may be used to supervise certain devices during operations of the system 10. The control panel systems 100, 102, 104 may be communicatively coupled to the certain of the underwater systems 26 via the conduits 106 that may be included as part of the networking system 24. In the depicted example, the networking system 24 may include umbilical reels 108 used to spool the conduits 106.

Two control pods 110 and 112 are also shown, which may be used to control certain underwater equipment such as a lower riser package (LMRP) 107. The panels 100, 102, 104 may operatively interface with the control pods 110, 112 to control, for example, operations of the underwater equipment 26, including the LMRP 107 and BOP 109. The LMRP 107 and BOP 109 may be used for enhanced safety operations during (and after) drilling.

Also shown are hydraulic systems, such as a fluid reservoir unit (FRU) 114, a diverter 116, a c 118, and a fluid mixing unit 120. The hydraulic systems 114, 116, 118 may be coupled to hydraulic conduits 124 to provide fluid (e.g., drilling fluid) to the well, for example, via a valve package system 122. The hydraulic systems 114, 116, 118 may additionally include a control panel (e.g., a HPU/Diverter control panel) suitable for controlling the delivery of the fluid into the well. An event logger 126 is also shown, suitable for the logging of drilling data for further analysis and review. It may be beneficial to improve cybersecurity of the systems shown. Accordingly, the techniques described herein may include a central security monitoring platform 128 that may receive security logs from the systems 100, 102, 104, 126 to detect malicious activities. Security logs may also be sent to be integrated into a user's existing cybersecurity infrastructure for security monitoring. For example, file system audits, honeypot files, data transfers, and so on, may be analyzed. In certain embodiments, machine learning may be used. For example, learning systems (e.g., neural networks, state vector machines, data mining learning systems, and so on) may be trained on normal operations and then detect variances from normal operations, which may be due to unauthorized access or malicious access to the various systems of the system 10, such as the systems 100, 102, 104, 126. The central security monitoring platform 128 may additionally receive data from subsea systems, e.g., systems 26, and use the data to determine if unwanted activity is being performed, such as intrusions, malicious behavior, unwanted activity, and the like.

Figure 3:
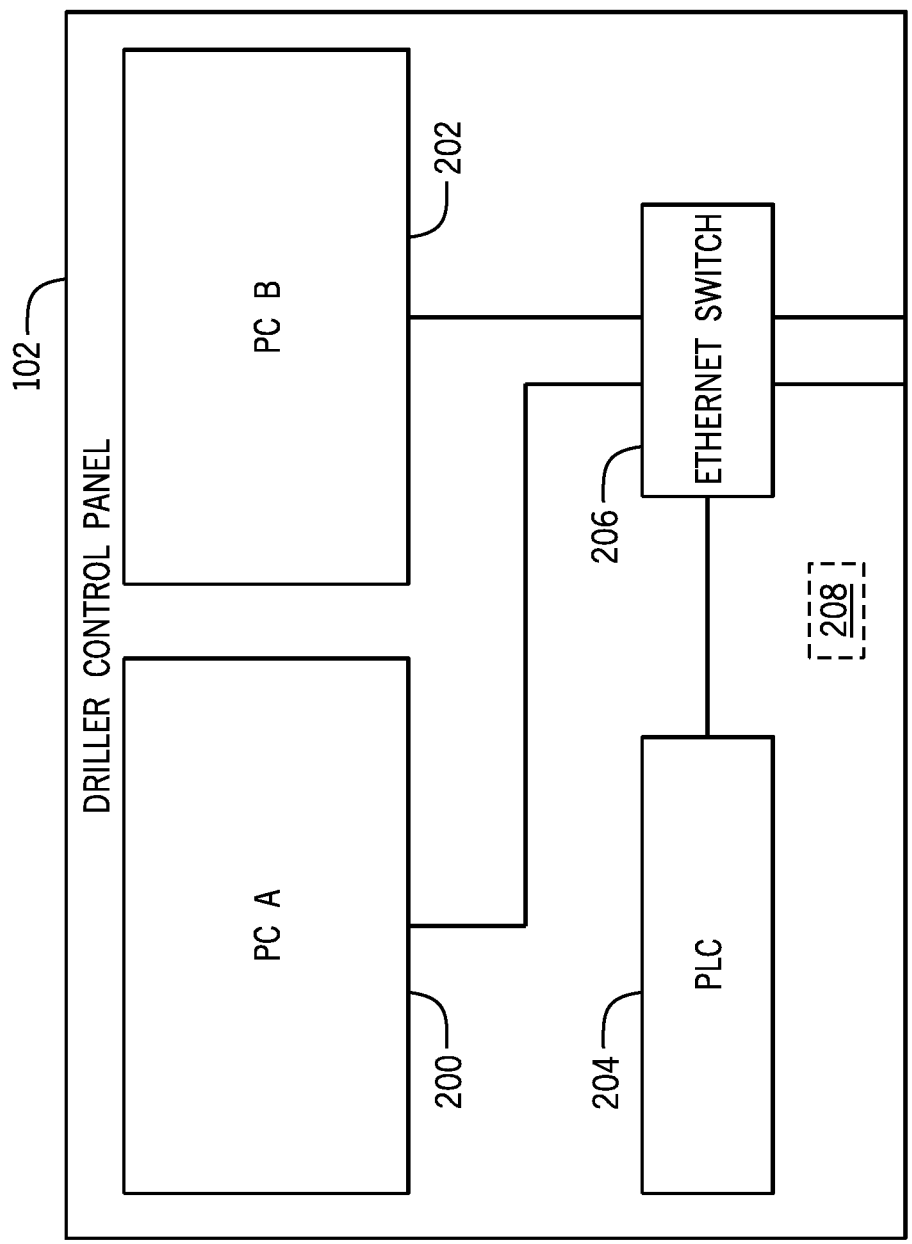
FIG. 3 is a block diagram of a drilling control panel included in the surface systems of FIG. 2, in accordance with an embodiment of the present disclosure.

It may be beneficial to illustrate further details of some of the systems included in the system 10. Accordingly and turning now to FIG. 3, the figure is a block diagram illustrating an embodiment of the DCP 102. In the depicted embodiment, the DCP 102 may include two computing systems 200, 202. For example, the computer systems 200, 202 may include personal computers, workstations, industrial computers, and the like, and may provide redundant operations. A programmable logic controller (PLC) 204 is also shown, suitable for providing for control of certain industrial operations, including drilling operations. The computing systems 200, 202, and the PLC 204 may be communicatively interconnected to each other and to other systems external to the DCP 102 via a switch 206, such as an ethernet switch.

In some embodiments, the operating systems for the computing systems 200, 202, the PLC 204, and/or the switch 206 may be upgraded for enhanced cybersecurity. For example, for the computing systems 200, 202, may have Windows 10™ available from Microsoft® Corporation of Redmond, Washington, U.S.A., first installed or later retrofitted as part of a security kit for the system 10. The operating system may then be hardened with security configurations and an application whitelisting solution (such as Microsoft® Applocker® which applies rules to specify which application is allowed to execute by, for example, using publisher, product name, file name, and/or file version that is allowed to execute) and connected to a firewall-protected network (e.g., network 24). Likewise, the PLC 204 and/or the switch 206 may have a secure operating system either installed by the manufacturer first or later retrofitted as part of the security kit. A firewall 208 (e.g., software based firewall, hardware based firewall) may also be included, and used, for example, to protect data being transmitted via the switch 206. As mentioned earlier HMIs may be provided (e.g., via the computing systems 200, 202), such as DCP HMIs, to operate certain drilling equipment. The HMI log data may be transmitted to the central security monitoring platform 128 in real-time and/or saved for analysis.

Figure 4:
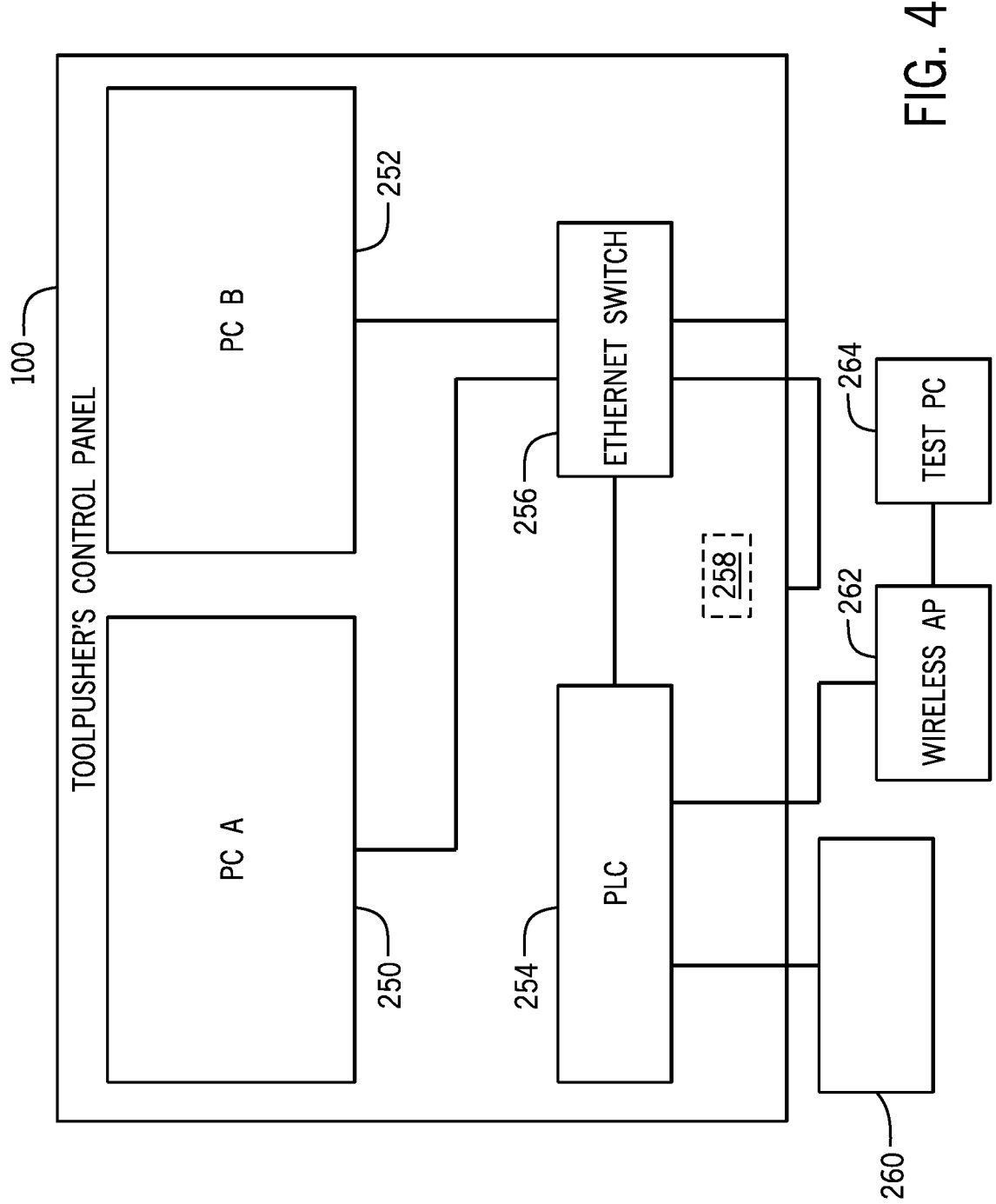
FIG. 4 is a block diagram of a tool pusher control panel included in the surface systems of FIG. 2, in accordance with an embodiment of the present disclosure.

FIG. 4 is a block diagram illustrating an embodiment of the TCP 100. In the depicted embodiment, the TCP 100 may include two computing systems 250, 252. For example, the computer systems 250, 252 may include personal computers, workstations, industrial computers, and the like, and may provide redundant operations. A programmable logic controller (PLC) 254 is also shown, suitable for providing for control of certain industrial operations, including drilling operations. The computing systems 250, 252, and the PLC 254 may be communicatively interconnected to each other and to other systems external to the TCP 100 via a switch 256, such as an Ethernet switch.

In some embodiments, the operating systems for the computing systems 250, 252, the PLC 254, and/or the switch 256 may be upgraded for enhanced cybersecurity. For example, for the computing systems 200, 202, may have Windows 10™ available from Microsoft® Corporation of Redmond, Washington, U.S.A., first installed or later retrofitted as part of a security kit for the system 10. The operating system may then be hardened with security configurations and an application whitelisting solution (such as Microsoft® Applocker®) and connected to a firewall-protected network (e.g., network 24). Likewise, the PLC 254 and/or the switch 256 may have a secure operating system either installed by the manufacturer first or later retrofitted as part of the security kit. A firewall 258 (e.g., software based firewall, hardware based firewall) may also be included, and used, for example, to protect data being transmitted via the switch 256. As mentioned earlier HMIs may be provided (e.g., via the computing systems 250, 252), such as TCP HMIs, to operate certain drilling equipment. The HMI log data may be transmitted to the central security monitoring platform 128 in real-time and/or saved for analysis. The SCP 104 may also have a similar architecture to the TCP 100 and DCP 102. That is, the SCP 104 may also include two computing devices, one PLC, a switch (Ethernet switch) and/or a firewall (software based firewall, hardware based firewall) for use in supervisory functions. SCP 104 data (e.g., HMI data) may likewise be analyzed via the central security monitoring platform 128 for detection of intrusions, malicious behavior, unwanted activity, and the like. A wireless access point 262 is also shown, suitable for providing wireless access to a testing computer 264. A subsea bottom profiler system 260 is also shown, used to ping the subsea and may be towed or autonomous.

Figure 5:
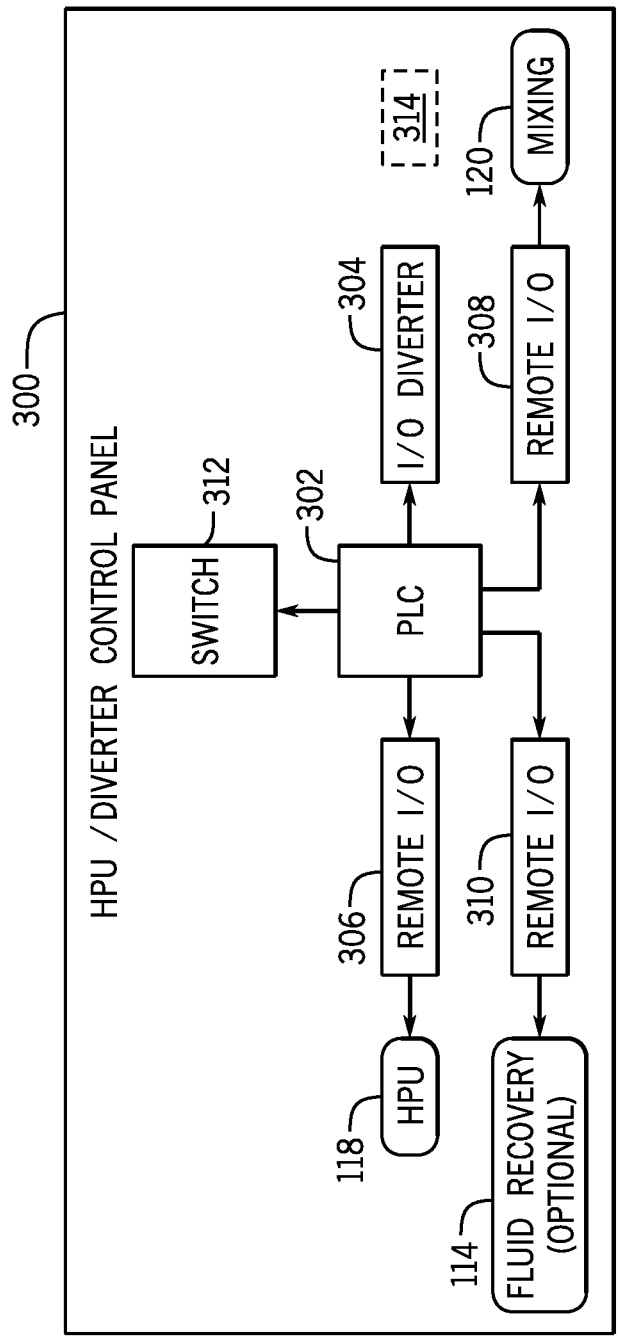
FIG. 5 is a block diagram of a hydraulic pressure/diverter control panel included in the surface systems of FIG. 2, in accordance with an embodiment of the present disclosure.

FIG. 5 is a block diagram illustrating an embodiment of an HPU/Diverter control panel 300 that may be used, for example, to provide fluid to the well by controlling the HPU 118, the Diverter 116, the FRU 114, and/or the fluid mixing unit 120. In the depicted embodiment, a PLC 302 may be used to receive inputs (e.g., sensor inputs) from the HPU 118, the Diverter 116, the FRU 114, and/or the fluid mixing unit 120 and then to control the HPU 118, the Diverter 116, the FRU 114, and/or the fluid mixing unit 120 by transmitting certain actuation signals. For example, a remote input/output (I/O) system 306 may receive sensor signals or other inputs from the HPU 118 and provide the signals to the PLC 302. The PLC 302 may then use control algorithms (e.g., proportional-integral-derivate (PID) algorithms, ladder logic, computer programs, and the like) to derive output signals that may actuate valves, pumps, and so on, of the HPU 118.

Likewise, the PLC 302 may interface with a remote input/output (I/O) system 308 to receive sensor signals or other inputs from the mixing unit 120 and provide the signals to the PLC 302. The PLC 302 may then use control algorithms (e.g., PID algorithms, ladder logic, computer programs, and the like) to derive output signals that may actuate valves, pumps, and so on, of the mixing unit 120. Similarly, the PLC 302 may interface with a remote input/output (I/O) system 310 to receive sensor signals or other inputs from the FRU 114 and provide the signals to the PLC 302. The PLC 302 may then use control algorithms (e.g., PID algorithms, ladder logic, computer programs, and the like) to derive output signals that may actuate valves, pumps, and so on, of the FRU 114. Also shown is an I/O diverter system 304 that may be used to provide for I/O between the PLC 302 and the diverter 116, for example, to sense diverter 116 operations and to control the diverter 116 based on control algorithms (e.g., PID algorithms, ladder logic, computer programs, and the like).

A switch 312 may provide for connections between the PLC 302 and other systems, such as the central security monitoring platform 128. Also illustrated is a firewall 314 (software based firewall, hardware based firewall) that may filter traffic and block certain access. As mentioned earlier, the panel 300 may have operating system(s) first installed or retrofitted to provide for improved security of the systems (e.g., PLC 302, I/O systems 304, 306, 308, 310, switch 312) included in the panel 300. The improved security operating system(s) may provide for capabilities such as secure compartmentalization to isolate certain processes from each other, encrypted data storage and retrieval, encrypted data transmission, memory leak prevention, internet protocol (IP) address and domain name server (DNS) leak prevention, and so on.

Figure 6:
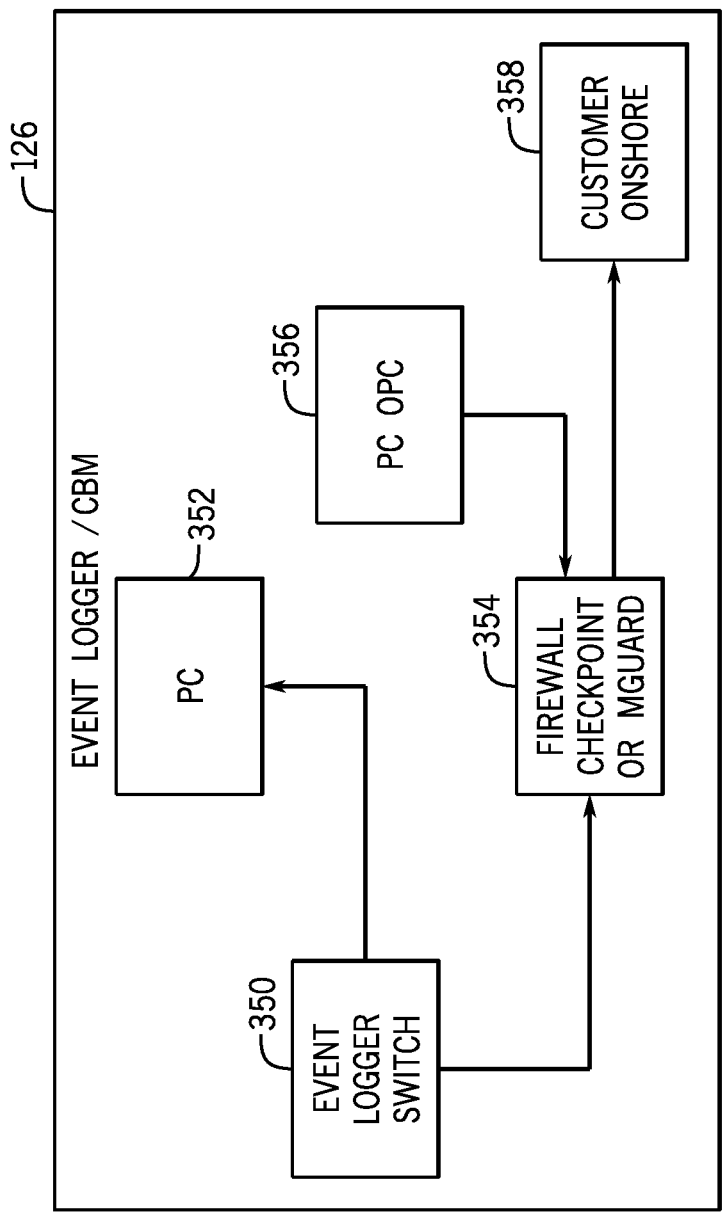
FIG. 6 is a is a block diagram of an event logger included in the surface systems of FIG. 2, in accordance with an embodiment of the present disclosure.

FIG. 6 is a block diagram illustrating further details of the event logger 126, which may also be used for condition based maintenance (CBM). In the illustrated embodiment, the event logger 126 may include a switch 350 communicatively coupling a computing system 352, to a firewall system 354 (e.g., software based firewall, hardware based firewall). The firewall system 354 may also couple a second computing system 356 and the switch 350, to an onshore system 358. In the illustrated embodiment the computing systems 352, 356, may include an operating system such as Windows 10™ available from Microsoft® Corporation of Redmond, Washington, U.S.A., first installed or later retrofitted as part of a security kit for the system 10. The operating system may then be hardened with security configurations and an application whitelisting solution (such as Microsoft® Applocker®) and connected to the firewall 354. One or both of the computing systems 352, 356 may include personal computers, workstations, industrial computers, and the like and may be set up for OLE for process control (OPC). The application whitelist may include a list of applications that may execute in a device and other applications not on the whitelist may not be allowed to execute.

The combination of an enhanced security operating system with the firewall 354 may provide for enhanced cybersecurity protection when the onshore system 358 connects to the event logger 126. For example, the event logger 126 may now filter certain IP addresses to only allow certain IP addresses to connect with the event logger 126, include certain security rules to block traffic (e.g., enable access to certain services), include stateful inspection (e.g., state, port, and protocol inspection), include integrated intrusion prevention, application awareness and control, cloud-based management, improve detection of suspicious activity via network and event correlation, and so on. Indeed, all of the systems described herein, e.g., TCP 100, DCP 102, SCP 104, FRU 114, Diverter 116, HPU 118, mixing unit 120, pods 110, 112, may not include the same or similar security enhanced capabilities as described with respect to the event logger 126.

Figure 7:
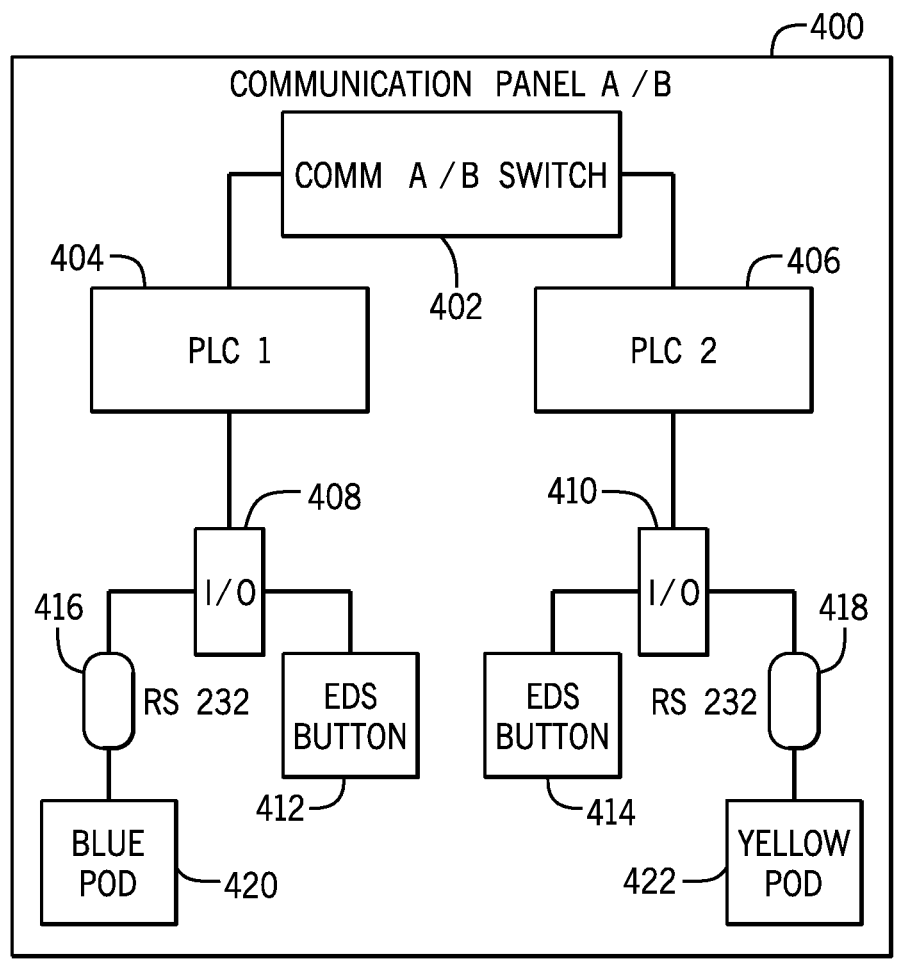
FIG. 7 is a block diagram of a communications panel included in the surface systems of FIG. 2 suitable for underwater communications with underwater systems, in accordance with an embodiment of the present disclosure.

FIG. 7 is a block diagram depicting an embodiment of a communications panel 400 that may be used to communicate between the control pods 110, 112 and the surface systems 28 (e.g., TCP 100, DCP 102, SCP 104, event logger 126, and/or HPU/diverter control panel 300). In the depicted embodiment, a switch 402 may be used to provide communicative connectivity with the surface systems 28 and PLC's 404, 406. The PLC's 404, 406 may be connect to the pods 110, 112 via I/O systems 408, 410, respectively. For example, RS 232 (e.g., serial communication) systems 416, 418 may be provided to send and receive signals from the pods 110, 112. As illustrated each pod 110, 112 may be operatively coupled to an emergency disconnect system (EDS) button 412, 414 respectively. Activating the EDS button 412 or 414 may then active a process to stop rig activity, for example, via the LMRP 107 and/or BOP 109.

The communications panel 400 may be located on the rig, and thus physical access may be only for rig personnel as opposed to onshore personnel. However, the communications panel 400 may include security enhancements to improve cybersecurity. For example, operating systems included in the PLCs 404, 406, the I/O systems 416, 418, and/or the pods 110, 112 may provide for capabilities such as secure compartmentalization to isolate certain processes from each other, encrypted data storage and retrieval, encrypted data transmission, memory leak prevention, IP and DNS leak prevention, and so on. Accordingly, a more secure communications panel 400 may be provided.

Figure 8:
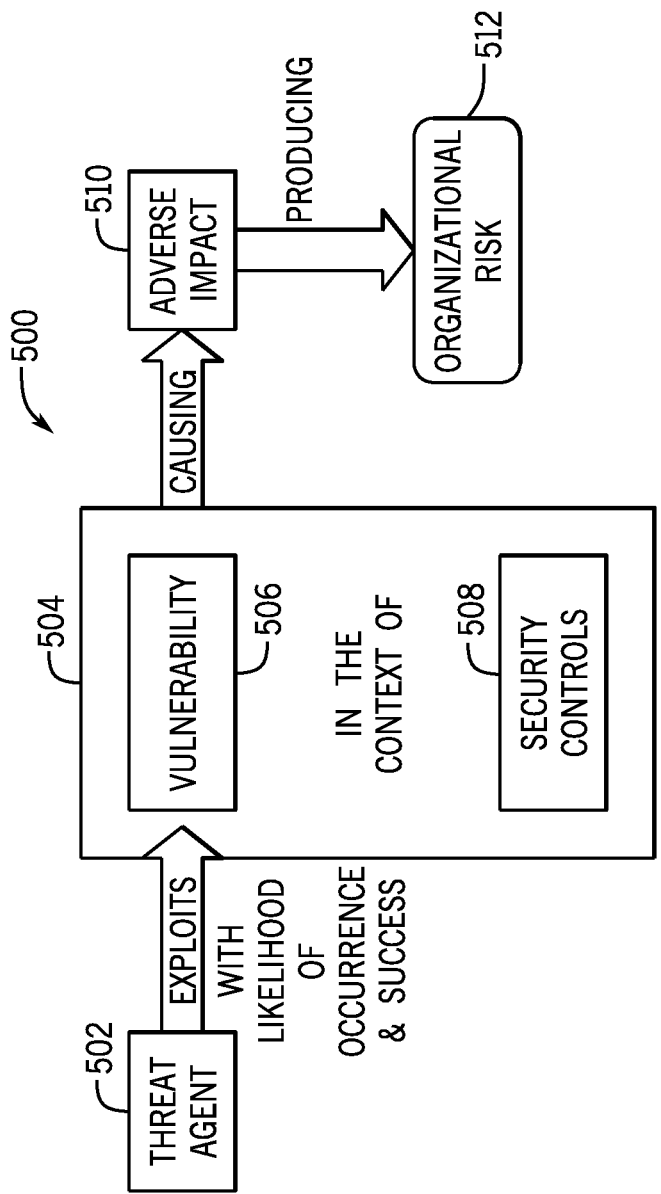
FIG. 8 is a flowchart of a process that may be used to derive certain organizational risks for the drilling system of FIG. 1, in accordance with an embodiment of the present disclosure.

It may be beneficial to describe certain process that improve security of the various systems described herein, e.g., underwater systems 26, surface systems 28, and/or networks 24, 36. Accordingly, FIG. 8 is a flowchart of a process 500 that may be used to derive certain organizational risks, for example, for an organization managing and/or owing the system 10. In the depicted embodiment, one or more threat agents 502 may be identified. The agents 502 may include hackers, disgruntled employees, cybercriminals, script kiddies, and so on, which may attempt unwanted activities on the underwater systems 26, surface systems 28, and/or networks 24, 36.

The process 500 may then derive (block 504) set of vulnerabilities 506 within the context of security controls 508 based on each threat agent 502. For example, each threat agent 502 may exploit one or more vulnerabilities 506, such as open network ports, denial of service vulnerabilities, open universal serial bus (USB) locations, credential issues (e.g., lack of credentials to use the systems), role based access issues (e.g., role(s) have access to functionality that is unwanted), shared data issues (e.g., openly shared folders), lack of backup issues, backups all in a single location issues, use of static IP addresses, unpatched software, hardware issues (e.g., BIOS issues, older hardware), lack of antivirus protection, missing firewall, unconfigured firewall, older firewall configuration, lack of malware detection issues, issues related to executing certain security measures at desired schedules (e.g., executing antivirus checks daily, executing malware detection daily, executing antivirus/malware checks on new downloads), social engineering attack issues, and so on.

The process 500 may then derive adverse impacts 510, for example, deriving that a given vulnerability may result in a system going offline, a system becoming infected, a system allowing unwanted access to certain services and/or software, and so on, as well as business impact (e.g., dollar amount lost, reputation loss metrics, economic loss, and so on). An organization risk model 512 may then be developed, which may be used to ameliorate or eliminate adverse impacts 510. For example, a triage approach may divide risk into categories (e.g., high, moderate, low) and then actively ameliorate or eliminate one or more a risk categories by updating certain systems, adding certain systems (e.g., adding firewalls, new hardware, new operating systems), reconfiguring certain systems, training employees, and so. For example, a process to harden certain systems is described with respect to FIG. 9.

Figure 9:
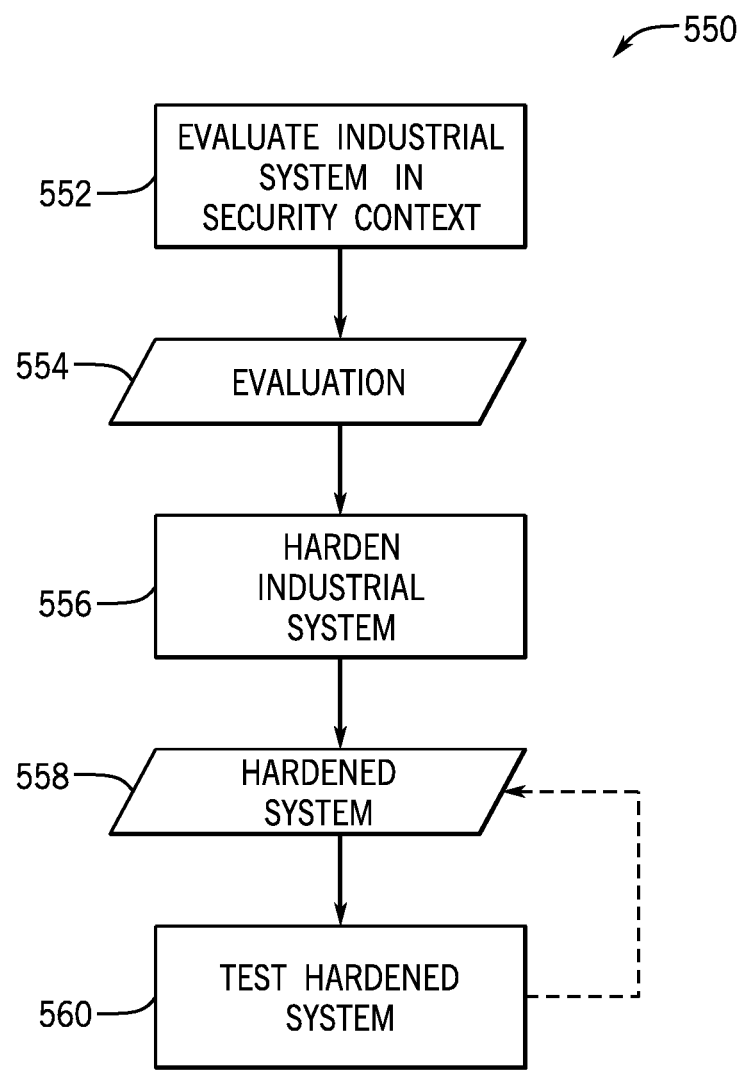
FIG. 9 is a is a flowchart of an embodiment of a process suitable for hardening certain systems, such as the drilling system of FIG. 1 or systems included in the drilling system, in accordance with an embodiment of the present disclosure.

More specifically, FIG. 9 is a flowchart of an embodiment of a process 550 suitable for hardening certain systems, such as the underwater systems 26, surface systems 28, and/or networks 24, 36. In the depicted embodiment, the process 550 may evaluate (block 552), the industrial system (e.g., system 10 or any systems included in system 10) in a security context. As mentioned earlier with respect to FIG. 8, threat agents 502 may be identified, vulnerabilities 506 may be derived, adverse impacts 510 may be found, and organizational risk 512 may be derived. An evaluation result 554 may include the aforementioned threat agents 502, vulnerabilities 506, adverse impacts 510, and organizational risk 512.

The process 550 may then harden (block 556) the system 10 and/or systems included in the system 10. For example, operating systems may be upgraded, firewalls may be installed, new systems may be installed (e.g., Windows 10™ or Windows 10™ derivatives, Applocker® or derivatives), open network ports may be closed, denial of service vulnerabilities may be addressed, USB access may be limited or stopped, credential issues may be addressed, role based access issues may be addressed, shared data issues (e.g., openly shared folders) may be addressed, backups may be created to execute at desired schedules and at desired locations, use of static IP addresses may be stopped, unpatched software may be patched, hardware issues may be addressed, antivirus protection may be added, firewalls may be added and/or reconfigured, malware detection may be added, security measures at desired schedules may be executed (e.g., executing antivirus checks daily, executing malware detection daily, executing antivirus/malware checks on new downloads), social engineering attack issues may be addressed (e.g., through employee training), and so on.

Accordingly, a more hardened system 558 (e.g., hardened system 10 or any system included in system 10) may be provided. In some embodiments, the hardened system 558 may be tested (block 560), for example at regular intervals, to improve security. Penetration testing, social engineering testing, and more generally, cyber security testing may be used to improve the hardened system 558. By applying the techniques described herein, a more secure (e.g., cyber secure) system 10 and/or systems included in system 10 may be provided.

Intrusion prevention system (IPS) enabled devices may be provided, such as computing devices (e.g., computers, workstations, industrial computers), programmable logic controllers (PLCs) or other industrial controllers, networking devices (e.g., network switches), firewalls, input/output (I/O) systems, or any device or subsystem of the panels (e.g., control panels 100, 102, 104, 300, 400), and/or event logger panel 126 described herein. The IPS enable devices may then provide for IPS functions, such as application whitelisting, secure compartmentalization to isolate certain processes from each other, provide encrypted data storage and retrieval, provide encrypted data transmission, provide memory leak prevention, provide internet protocol (IP) address leak prevention, provide domain name server (DNS) leak prevention, or a combination thereof.

It should be appreciated that all of the features discussed above with respect to FIGS. 1-9 may be combined in any suitable manner. While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is intended to cover all modifications, equivalents, and alternatives falling within the spirit and scope of the disclosure as defined by the following appended claims.

The invention claimed is:

1. A method of security enhancing a drilling system, the method comprising:
deriving one or more threat agents;
deriving a vulnerability for a control panel system included in a drilling system based on the one or more threat agents, wherein the control panel system is configured to be communicatively coupled to a pressure control equipment;
deriving an adverse impact of the vulnerability;
deriving an organizational risk based on the adverse impact; and
providing at least one intrusion prevention system (IPS) enabled device in the control panel system, wherein the at least one IPS enabled device is configured to provide for one or more IPS functions based on the adverse impact of the vulnerability, based on the organizational risk, or a combination thereof, wherein providing the at least one IPS enabled device comprises upgrading an existing control panel device of the at least one IPS enabled device in situ by upgrading an operating system of the control panel device, and by adding an application whitelist that lists applications that are allowed to execute in the control panel device, wherein the at least one IPS enabled device is configured to execute a secure operating system configured to provide secure compartmentalization to isolate certain processes from each other, provide encrypted data storage and retrieval, provide encrypted data transmission, provide memory leak prevention, provide internet protocol (IP) address leak prevention, provide domain name server (DNS) leak prevention, or a combination thereof, and wherein the at least one IPS enabled device further comprises a computing system, a firewall, a network switch, a programmable logic controller (PLC), an input/output system, or a combination thereof.

2. The method of claim 1, wherein the one or more IPS functions comprise applying a rule to specify which application is allowed to execute on the at least one IPS enabled device.

3. The method of claim 1, wherein the control panel system comprises at least one selected from the group consisting of: a tool pusher control panel (TCP); a driller control panel (DCP); a supervisor control panel (SCP); a hydraulic pressure unit (HPU)/diverter control panel; and a communications panel.

4. The method of claim 1, wherein the pressure control equipment comprises a blowout preventer.

5. The method of claim 1, further comprising: testing the control panel system after the step of providing the at least one IPS enabled device in the control panel system.

6. The method of claim 5, further comprising: wherein the step of testing comprises at least one selected from the group consisting of: penetration testing; social engineering testing; and cyber security testing.

* * * * *